(12) United States Patent
Riefe

(10) Patent No.: US 6,655,716 B2
(45) Date of Patent: Dec. 2, 2003

(54) KINETIC ENERGY ABSORBER

(75) Inventor: Richard K. Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 134 days.

(21) Appl. No.: 09/941,277

(22) Filed: Aug. 28, 2001

(65) Prior Publication Data

US 2003/0042723 A1 Mar. 6, 2003

(51) Int. Cl.[7] .................................................. B62D 1/19
(52) U.S. Cl. ....................................... 280/777; 188/374
(58) Field of Search ............................ 280/777; 74/492, 74/193; 188/371, 374

(56) References Cited

U.S. PATENT DOCUMENTS

| | | | | |
|---|---|---|---|---|
| 3,392,599 A | * | 7/1968 | White | 74/492 |
| 3,788,148 A | * | 1/1974 | Connell et al. | 74/492 |
| 4,330,139 A | * | 5/1982 | Katayama | 280/777 |
| 4,867,003 A | * | 9/1989 | Beauch et al. | 74/492 |
| 5,026,092 A | | 6/1991 | Abramczyk | 280/777 |
| 5,230,533 A | * | 7/1993 | Yamaguchi | 280/775 |
| 5,375,881 A | | 12/1994 | Lewis | 280/777 |
| 5,517,877 A | | 5/1996 | Hancock | 74/492 |
| 5,605,352 A | | 2/1997 | Riefe et al. | 280/777 |
| 5,788,278 A | | 8/1998 | Thomas et al. | 280/777 |
| 6,378,903 B1 | * | 4/2002 | Yabutsuka et al. | 280/777 |

* cited by examiner

Primary Examiner—Paul N. Dickson
Assistant Examiner—Laura B. Rosenberg
(74) Attorney, Agent, or Firm—Michael D. Smith

(57) ABSTRACT

A kinetic energy absorption device suitable for use with a collapsible steering column includes a first and second plastically deformable member have a traveling bight, a pusher proximate to a first part of the first member attached to a first body, a catch allowing the second member move a limited distance with respect to the pusher, and an anvil arrangement fixed to a second body. The anvil arrangement is positioned proximate the traveling bights, which have a shape corresponding with an anvil surface of thereof. The anvil arrangement forces the traveling bight of the first member to travel along a length of the first member upon initial relative movement between the first and second bodies, and then forces the traveling bight of the second member to travel along a length of the second member.

36 Claims, 3 Drawing Sheets

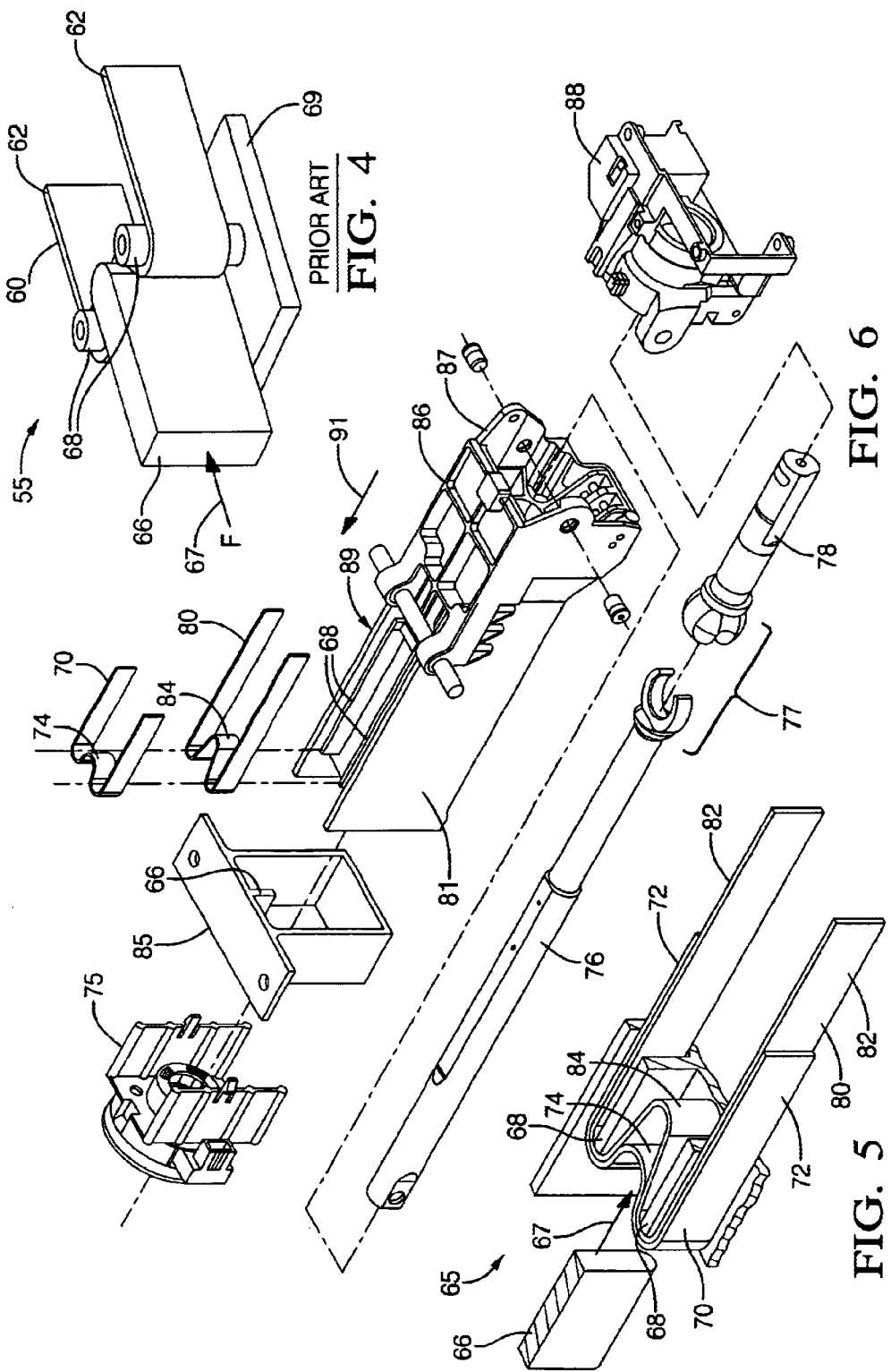

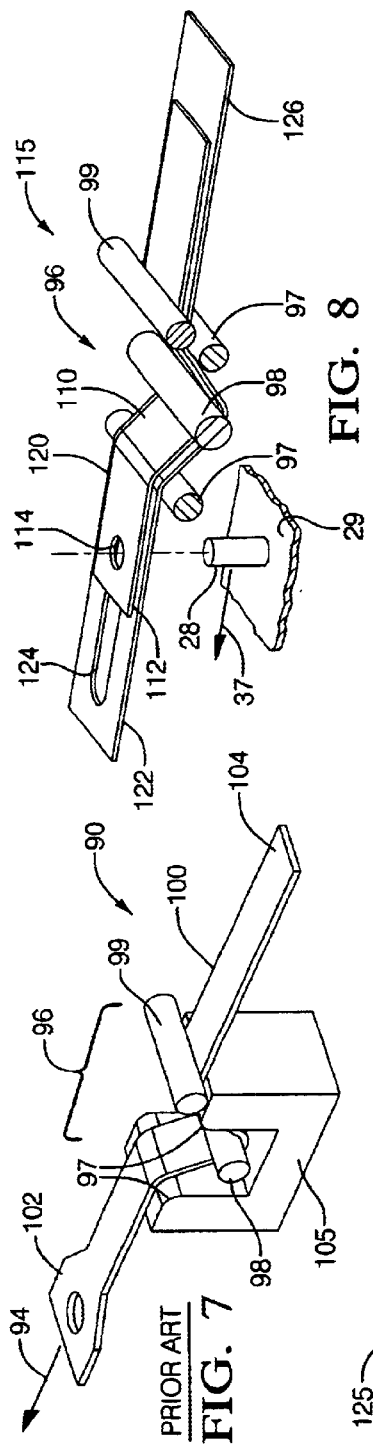

KINETIC ENERGY ABSORBER

TECHNICAL FIELD

The present invention relates to a kinetic energy absorption mechanism having applicability to vehicular collapsible steering columns.

BACKGROUND

Kinetic energy absorption devices are known for use in vehicles to reduce the likelihood of injury in the case of an accident. Such devices come in many different forms. One form that is particularly effective at absorbing significant quantities of energy in a relatively small amount of space employs a plastically deformable member, such as a plastically deformable metal wire or strap, a pusher, and an anvil across which the plastically deformable member is drawn, dissipating energy as the member is deformed. The member is initially bent to form a traveling bight which is positioned over the anvil. As the pusher draws the member over the anvil, the traveling bight travels down the length of the strap.

An example of this technique is described in U.S. Pat. No. 5,788,278, issued Aug. 4, 1998 to Thomas et al., which is wholly incorporated herein by reference. In this patent, a metal strap is formed into a rough M shape with the two legs much longer than the web extending between them. Each leg of the M is positioned on opposite sides of two anvils, and a central pusher is positioned between the two anvils. The pusher is attached to the body of the vehicle, while the pair of anvils are attached to a steering column housing. Upon the instance of a forward collision, the driver is expected to impact the steering wheel which will impart a compressive force on the steering column housing, causing the anvils to move past and on either side of the pusher. The metal strap will be drawn across the anvils as the center is pushed down between them.

Although the use a plastically deformable member is an effective and reliable means for absorbing significant quantities of kinetic energy in a compact space, it has heretofore been impossible to use this technology to adequately vary the amount of resistance in response to various loads. Because vehicular accidents occur with varying degrees of severity, it would be desirable to provide an energy absorption device that will provide a smaller amount of resistance in the case of a less severe collision, and a greater amount of resistance in the case of a more severe collision.

Prior attempts at using a plastically deformable member to vary the amount of resistance with displacement of the steering column housing have been inadequate. This is because the most difficult design performance centers on the desire to begin with a low force level and transition to higher levels. U.S. Pat. No. 5,375,881, issued Dec. 27, 1994 to Lewis, shows in FIG. 2a a metal strap that is utilized in a manner similar to that described above with reference to U.S. Pat. No. 5,778,278 above, but in this case, there are no anvils. Instead, Lewis relies on the bending and tensile strength to keep the "free" ends from buckling under compression while the inner part is under tension, in effect, pulling the bight down. The use of an anvil is preferred, since the effect of friction between the traveling bight and the anvil is desirable, and the risk of buckling is eliminated through the use of anvils.

The strap in FIG. 2a of Lewis has a varying cross section. Specifically, the Lewis strap includes a narrower section in the middle, at the vicinity of the pusher, and wider sections toward the bottom of the opposite legs. Because of the narrower section in the middle, there is a reduced initial resistance which increases when the traveling bight reaches the wider sections. The problem with this design is that the strap may fracture if the transition to the high force exceeds the tensile strength of the narrower section. Since the narrow portions of the strap have just been significantly worked by bending, the tensile strength of the narrower sections may be significantly compromised. Because of the increased resistance due to friction between the anvils and the traveling bights, this risk is heightened if anvils are used.

U.S. Pat. No. 5,026,092, issued Jun. 25, 1991 to Abramczyk, describes an energy absorbing steering column having a passive restraint load limiting column support system adapted to come into play only when the primary energy absorbing system, whatever it may be, fails to provide the energy absorbing controlled collapse of the steering column assembly as designed, or one which is adapted to come into play only upon receiving impact loads of greater magnitude than those for which the system was designed. This system includes a steering column support bracket that is design to fracture under high impact, allowing the steering column to move upwardly in a second degree of freedom. The steering column will then impact the instrument panel, causing its plastic deformation and that of the instrument panel itself, thereby providing additional required energy absorption. (See column 5, lines 10–50 of Abramczyk.) This system does not provide the kind of energy absorption characteristics desired of a collapsible steering column, but rather dispenses with the utility of a collapsible steering column entirely at impact loads greater than a specified threshold.

SUMMARY

The disadvantages of the prior art noted above and otherwise are overcome by a kinetic energy absorption device suitable for use with a collapsible steering column that includes a first and second plastically deformable member have a traveling bight, a pusher proximate to a first part of the first member attached to a first body, a catch allowing the second member move a limited distance with respect to the pusher, and an anvil arrangement fixed to a second body. The anvil arrangement is positioned proximate the traveling bights, which have a shape corresponding with an anvil surface of thereof. The anvil arrangement forces the traveling bight of the first member to travel along a length of the first member upon initial relative movement between the first and second bodies, and then forces the traveling bight of the second member to travel along a length of the second member.

BRIEF DESCRIPTION OF THE DRAWINGS

These and other features will be appreciated by reference to the detailed description and accompanying drawings in which:

FIG. 4 is a schematic representation of a prior art energy absorption device using an M-strap;

FIG. 5 is a schematic representation of a varying-resistance energy absorption device using an M-strap configuration;

FIG. 6 is an exemplary implementation of the energy absorption device of FIG. 5;

FIG. 7 is a schematic representation of a prior art energy absorption device using an S-strap;

FIG. 8 is a schematic representation of a varying-resistance energy absorption device using an S-strap;

FIG. 9 is an exemplary implementation of the energy absorption device of FIG. 8; and FIG. 10 is a pair of S-straps used in the implementation of FIG. 9.

DETAILED DESCRIPTION

Figure 1:
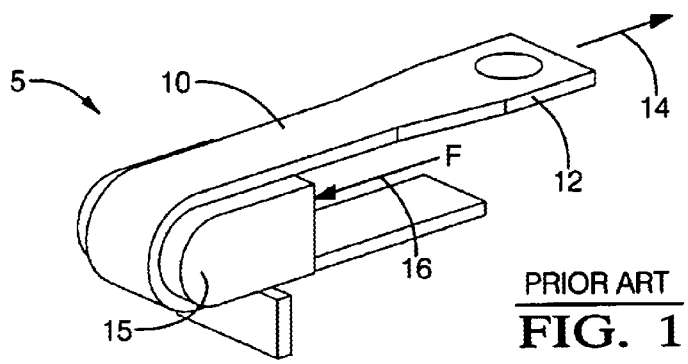
FIG. 1 is a schematic representation of a prior art energy absorption device using a J-strap.

FIG. 1 schematically shows the operation of a known kinetic energy absorption device 5 employing a J-strap configuration. Strap 10 includes a traveling bight that is looped over anvil 15. A first end 12 of strap 10 is pulled in the direction of arrow 14 away from anvil 15. Free end 16 of strap 10 is then pulled towards and around anvil 15, causing the traveling bight to travel down the length of strap 10.

Figure 2:
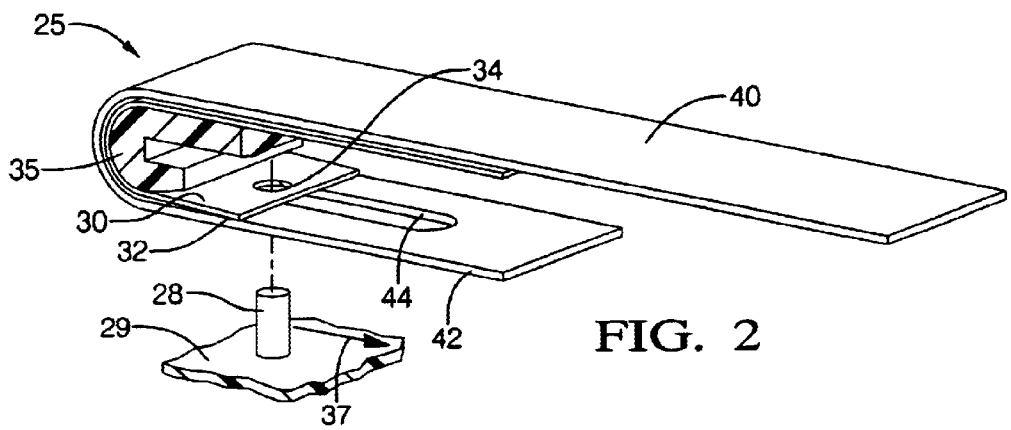
FIG. 2 is a schematic representation of a varying-resistance energy absorption device using a J-strap configuration.

FIG. 2 shows a partially exploded view of a varying-resistance energy absorption device 25 employing a J-strap configuration. Pin 28 is fixed to a first support 29 and anvil 35 is mounted to a second support (not shown). Anvil 35, in this instance, is cylindrical and may be rotatably supported so that it is free to rotate on its axis. Pin 28 is positioned in hole 34 of first strap 30 and slot 44 of second strap 40. During an event for which energy absorption is required, pin 28 moves away from anvil 35 in the direction of arrow 37. Initially, pin 28 pushes against first end 32 of first strap 30, causing first strap 30 to be pulled around anvil 35 as previously described with respect to FIG. 1. Pin 28 therefore acts as the pusher in this embodiment. During this time, pin 28 travels in slot 44 formed in second strap 40, and so second strap 40 remains stationary with respect to anvil 35. However, once pin 28 reaches the opposite end of slot 44, it operates as a catch, limiting further relative motion between the second strap 40 and the pin 28. Pin 28 then begins to pull second strap 40 from first end 42 thereof.

Figure 3:
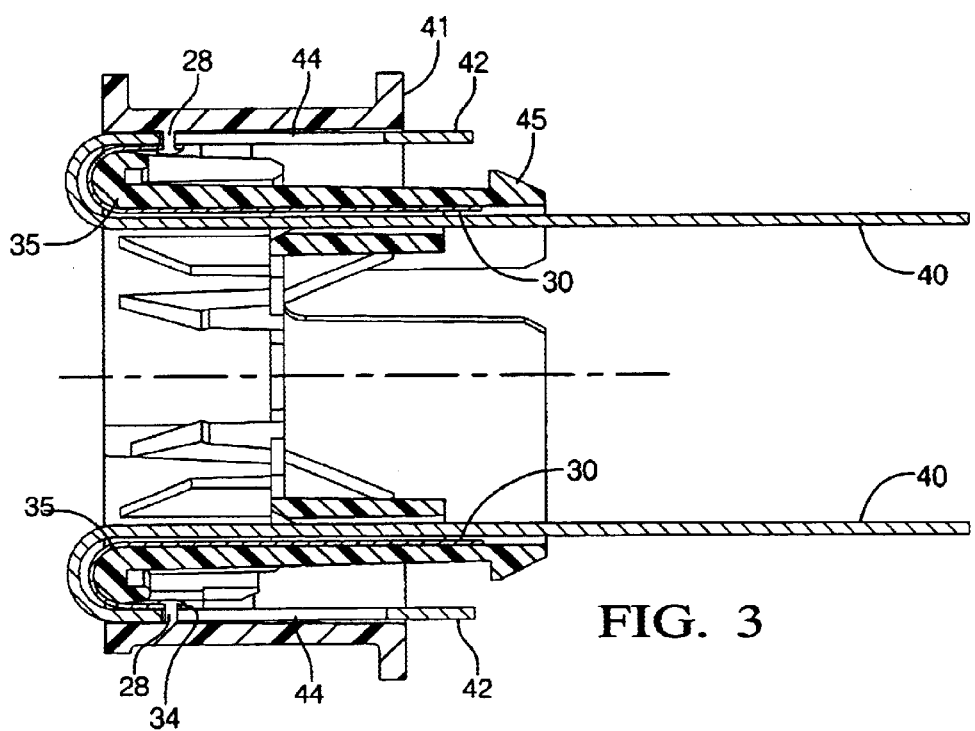
FIG. 3 is an exemplary implementation of the energy absorption device of FIG. 2.

FIG. 3 shows an exemplary implementation of the multi J-strap configuration described above with respect to FIG. 2. In this case, a collar 41 is concentrically disposed about a sleeve 45 and the steering wheel shaft (not shown). Collar 41 is fixed to a body of a vehicle (not shown) while sleeve 45 is attached to a steering column housing. Upon impact, sleeve 45 is forced to the left as shown in the drawing to pass through collar 41, which remains stationary with the vehicle. Collar 41 includes a pair of pins 28 which extend through apertures 34 formed in respective first straps 30, of which two are shown. Second straps 40 include respective slots 44 along which pins 28 travel during a first portion of the energy absorbing movement. As sleeve 45 moves to the left, anvils 35 formed into sleeve 45 push against a traveling bight formed in first straps 30, causing first straps 30 to bend around anvils 35, thereby generating a resistive force and absorbing kinetic energy.

At some point, pins 28 will reach a position in slots 44 opposite from that shown, and pins 28 will then hold first ends 42 of straps 40 stationary with respect to collar 41. When this happens, further movement to the left of sleeve 45 will cause the respective free ends of straps 40 to be pulled toward and around anvils 35, thereby significantly increasing the resistance and therefore energy absorption.

A second embodiment of the invention will now be described with reference to FIGS. 4–6. FIG. 4 schematically shows the operation of a known kinetic energy absorption device 55 employing an M-strap configuration. Strap 60 includes two traveling bights looped over respective anvils 68. A central bight is placed adjacent pusher 66. As a force is applied on pusher 66 as represented by arrow 67 free ends 62 of strap 60 are drawn around respective anvils 68, causing the traveling bights to travel down the length of the free ends of strap 60. Note here that anvils 68 may be rotatably supported or not, depending on whether additional friction resistance is desired.

FIG. 5 shows a schematic representation of a varying-resistance energy absorption device 65 employing an M-strap configuration. Pusher 66 is fixed to a first support (not shown) and anvils 68 are mounted to a second support (not shown). During an event for which energy absorption is required, pusher 66 moves in the direction of arrow 67 with respect to anvils 68. Initially, pusher 66 pushes against first strap 70, at central bight 74 causing the first strap 70 to deform with free ends 72 being drawn around respective anvils 68. During this time, second strap 80 remains stationary in its position as pusher 66 has yet to contact second strap 80. However, once pusher 66 reaches central bight 84 of second strap 80, pusher 66 begins to pull the central portion of second strap 80 away from anvils 68, causing free ends 82 of second strap 80 to be pulled around respective anvils 68. In this way, pusher 66 and recessed central bight 84 of second strap 80 cooperate as a catch, the recess of central bight 84 permitting limited relative motion between said pusher and said central bight 84.

FIG. 6 shows a partially exploded diagram of an exemplary implementation of a varying resistance energy absorption device employing an M-strap configuration as described above with respect to FIG. 5. Telescopically-collapsible steering shaft 76 is positioned within a steering column housing 86 and supported at a forward end by bearing support 75 and at a second end by a bearing in an enlarged, reinforced rear end 87 of steering column housing 86. Steering shaft 76 is connected to an upper shaft 78 by universal joint 77; upper shaft 78 is positioned in tilt housing 88.

Bracket 85 is fixed to a body of the vehicle (not shown) while steering column housing 86 is positioned more with respect to a steering wheel (not shown). Steering column housing 86 includes a cavity 89 which houses the energy absorption device as will now be described. Cavity 89 includes a pair of anvils 68 upon which a first strap 70 and a second strap 80 are nested. A first end 81 is inserted through bracket 85 and attached to bearing support 75. Bracket 85 includes a pusher 66 which is aligned with central bights 74 and 84 of first and second straps.

In the case of a frontal collision, the driver will impact the steering wheel (not shown) and the force thereof will be transferred to steering column housing 86, which will be urged forward in the direction of arrow 91. Anvils 68, being attached to steering column housing 86 will push first and second straps 70 and 80 forward. Pusher 66 of stationary bracket 85 will initially contact central bight 74 of first strap 70, causing first strap 70 to be pulled across anvils 68. At some point thereafter, pusher 66 will reach the location of the central bight 84 in second strap 80, then causing second strap 80 to be pulled across anvils 68, thereby significantly increasing the resistance and therefore energy absorption.

A third embodiment will now be described with reference to FIGS. 7–10. FIG. 7 schematically shows the operation of a known kinetic energy absorption device 90 employing an exemplary S-strap configuration. The S-strap configuration is usually characterized by a plastically deformable strap 100 and bending configuration wherein a first end 102 and a second end 104 move together during the energy absorption process, with at least two traveling bights therebetween that travel down the length of the strap, although this is by no means a requirement of the S-strap configuration. In the configuration of FIG. 7, strap 100 includes several traveling bights arranged in an anvil arrangement 96 that includes two bending surfaces 97 formed in a block 105, and a central roller 98, and a stay roller 99. A first end 102 of strap 100 is pulled in the direction of arrow 94 away from anvil arrangement 96. Free end 104 of strap 100 is pulled towards anvil arrangement 96, causing strap 100 in contort around the various bending surfaces, thereby dissipating a significant amount of energy. It should be noted that although three traveling bights are shown in this example, any combination or number of bends may be used. An example of a known S-strap configuration using only two bends is disclosed in U.S. Pat. No. 5,605,352, issued Feb. 25, 1997 to Riefe et al.

FIG. 8 shows a schematic representation of a partially exploded varying-resistance energy absorption device 115 employing an S-strap configuration. Pin 28 is fixed to a first support 29 and anvil arrangement 96 is fixed to a second support (not shown). Anvil arrangement 96, in this instance, includes a plurality of rollers 97, 98, and 99. During an event for which energy absorption is required, pin 28 moves away from anvil arrangement 96 in the direction of arrow 37. Initially, pin 28 pushes against first end 112 of first strap 110, causing first strap 110 to be pulled through anvil arrangement 96 as previously described with respect to FIG. 7. Pin 28 therefore acts as a pusher in this embodiment. During this time, pin 28 travels in slot 124 formed in second strap 120, and so second strap 120 remains stationary with respect to anvil arrangement 96. However, once pin 28 reaches the opposite end of slot 124, it begins to pull second strap 120 from first end 122 thereof. In this way, pin 28 and slot 124 operate as a catch allowing only limited movement between second strap 120 and anvil arrangement 96. Although first strap 110 is shown as being somewhat shorter than second strap 120, this does not have to be the case. Thus, the work of the force pulling pin 28 and anvil arrangement 96 apart can be absorbed by first the first strap 110 and then the second strap 120, or by first the first strap 110 and then both the first and second straps 110, 120.

FIG. 9 shows a diagram of an exemplary assembled collapsible steering column 130 implementing the varying resistance energy absorption device employing an S-strap configuration as described above with reference to FIG. 8. Steering column 130 includes an upper steering column housing 137 that is coaxially received in a lower steering column housing 135. Coaxially received within upper and lower steering column housings 137, 135 are upper and lower steering shafts 127, 125, which are telescopically collapsible within the respective housings. Upper and lower steering column housings 137, 135 are attached at a midpoint by a frangible connection (not shown) so that upon impact of a compressive force of sufficient strength, the frangible connection will shear, and allowing the compressive force to be absorbed by first and second straps 110, 120, shown in FIG. 10. Although only the free end 126 of second strap 120 is visible extending from anvil arrangement 96, it will be understood that the opposite end of the straps will be pulled as described above with reference to FIG. 8, thereby causing at first a first amount of resistance, and then a second amount of resistance as the upper and lower steering column housings are collapsed.

While the invention has been shown and described with respect to several embodiments, it is to be appreciated that these embodiments are exemplary only of the invention, and are not limiting. For example, although the first strap in each embodiment is shown as being somewhat shorter than second strap, this does not have to be the case. Thus, the work of the pusher and anvil can be initially absorbed by the first strap and then the second strap, or initially by the first strap, and then both the first and second straps. If the second strap has a greater bending strength than first strap, a significantly increased resistance will be realized upon the pusher reaching the central bight of the second strap, even if the free end of the first strap has completely passed across the anvil arrangement.

Furthermore, the plastically deforming members do not have to take the form of flat metal straps as shown. Various other cross section shapes may be utilized, such as round, square, oval, etc. Moreover, the cross sectional areas do not need to be uniform throughout the operative length of the member as shown. For example, FIG. 7 of U.S. Pat. No. 5,788,278 (fully incorporated herein) shows a modified metal strap having a gradually reduced cross section towards the free end, thereby customizing the energy-absorbing characteristic of the plastically deformable member.

Furthermore, while only two straps are shown nested together, it is contemplated that any number of straps may be nested together or placed adjacent to one-another employing the same principle wherein additional straps are called into play as the displacement from an initial condition increases. In addition, while a catch comprising a pin and slot arrangement is shown for the first and third embodiments, any type of catch arrangement could be substituted therefore.

Furthermore, while all the embodiments shown employ an anvil arrangement for bending the traveling bight, an anvil arrangement, while preferred, is not absolutely necessary as described in the background portion of this document. One of ordinary skill could conceive of modifications to the described embodiments sans the anvil arrangement.

Therefore, as will be appreciated by one skilled in the art, these and many other variations are possible without departing from the spirit and scope of the invention.

I claim:

1. An energy absorption device comprising:

a first plastically deformable member having a traveling bight;

a second plastically deformable member having a traveling bight;

a pusher attached to a first body proximate a first part of said first member;

a catch allowing said second member to move a limited distance with respect to the pusher, said distance having a limit beyond which a first part of said second member is effectively fixed to said pusher;

an anvil arrangement fixed to a second body, said anvil arrangement being positioned proximate said traveling bights, said traveling bights having a shape corresponding with an anvil surface of said anvil arrangement;

said anvil arrangement arranged to force said traveling bight of said first member to travel along a length of said first member upon initial relative movement of said first and second bodies, and cause, upon continued relative movement of said first and second bodies, said traveling bight of said second member to travel along a length of said second member upon said catch reaching said limit, wherein as said traveling bights travel down respective ones of said first and second members, energy is absorbed and dissipated.

2. The device of claim 1 wherein said first member is shorter than said second member.

3. The device of claim 1 wherein said second member has a larger cross-sectional area than said first member when said area is perpendicular to a direction of travel of said first and second members.

4. The device of claim 3, said cross sectional area of said first member and said second member being substantially constant throughout an operative length of said first and second members, said operative length comprising a portion of said first and second members starting at an initial location of said traveling bight, and ending at said free end.

5. The device of claim 1, said first member and said second member each comprising a plastically deformable metal strap.

6. The device of claim 1 wherein one of said first and second bodies comprises a steering column housing and another of said first and second bodies comprises a vehicle body.

7. The device of claim 1 wherein said first member and said second member are configured in a J configuration characterized by each said first portion being at a first end of a respective one of said first and second members, each said first and second members also having a free end opposite said first end, each said first end and said free end being arranged generally parallel to each other, said traveling bights initially being adjacent to said first end prior to said relative movement of said first and second bodies said first end of said first body being fixed to said pusher, said first end of said second body including said catch.

8. The device of claim 7, wherein said first member and said second member are nested against one another.

9. The device of claim 7 wherein one of said first and second bodies comprises a steering column housing and another of said first and second bodies comprises a vehicle body.

10. The device of claim 7, wherein said anvil arrangement comprises a sleeve, said sleeve being positionable about a steering shaft, said first body comprising a collar concentrically disposable about said sleeve, said free end of each of said first and second members extending along an axis of said sleeve and said collar.

11. The device of claim 10 further comprising a second first member and a second second member disposed approximately 180 degrees from said first and second members.

12. The device of claim 7, said pusher comprising a pin, said first member having a hole at said first end through which said pin extends thereby fixing said first end to said pusher, said catch comprising an elongated slot formed in said second member cooperating with said pin to permit said limited movement between said pin and said second member.

13. The device of claim 1 wherein said first member and said second member are configured in an M configuration, each said first and second members having two free ends generally extending in a first direction, a second traveling bight, and a central bight generally extending in said first direction, said anvil arrangement comprises two anvil surfaces each positioned between said central bight and said free ends and proximate said traveling bight and said second traveling bight of said first and second members, said pusher being positioned proximate said central bight of said first member; said catch comprising a separation between said pusher and said central bight of said second member.

14. The device of claim 13 wherein said first member and said second member are nested against one another.

15. The device of claim 13 wherein one of said first and second bodies comprises a steering column housing and another of said first and second bodies comprises a vehicle body.

16. The device of claim 13 wherein said anvil arrangement comprises a recess formed in a steering column housing, said recess including said first and second anvil surfaces, said pusher comprising a bracket attachable to a body of a vehicle.

17. The device of claim 1 wherein said first member and said second member are configured in an S configuration characterized by each said first portion being at a first end of a respective one of said first and second members, each said first and second members also having an opposite end, said traveling bights being adjacent to said first end prior to said relative movement of said first and second bodies.

18. The device of claim 17 wherein each said first end and said opposite end being substantially parallel to each other and extending in opposite directions.

19. The device of claim 18 wherein said anvil arrangement comprises at least three anvil surfaces, each said first end and said opposite end extending in a common plane.

20. The device of claim 17 wherein said first member and said second member are nested against one another.

21. The device of claim 17 wherein one of said first and second bodies comprise a steering column housing and another of said first and second bodies comprise a vehicle body.

22. A kinetic energy absorbing collapsible steering column comprising:
an energy absorbing device absorbing kinetic energy by resisting compressive force against said collapsible steering column; the energy absorbing device including a steering column housing, a first plastically deformable strap and a second plastically deformable strap, the first strap overlapping the second strap;
wherein said compressive force being exerted against said steering column housing and causes displacement of said steering column housing and is initially directed through said first strap and not said second strap and wherein portions of said first strap slide over said second strap while said second strap remains stationary with respect to said first strap, and at some predefined point thereafter during said displacement, said compressive force is passed through said second strap and wherein said first strap and said second straps are fixed relative to each other in a direction of the compressive force, each of said first and second straps including a traveling bight, said straps absorbing said kinetic energy by forcing said traveling bight to travel a length of said straps.

23. The steering column of claim 22 wherein said first strap is shorter than said second strap.

24. The steering column of claim 22 wherein said second strap has a larger cross-sectional area than said first strap.

25. The steering column of claim 24, said cross sectional area of said first strap and said second strap being substantially constant throughout an operative length of said first and second straps, said operative length comprising a portion of said first and second straps starting at an initial location of said traveling bight, and ending at a free end.

26. The steering column of claim 22, said first strap and said second strap each comprising a plastically deformable metal strap.

27. A kinetic energy absorbing collapsible steering column comprising:
an energy absorbing device absorbing kinetic energy by resisting compressive force against said collapsible steering column; the energy absorbing device including a steering column housing, a first plastically deformable member and a second plastically deformable member wherein said compressive force being exerted against said steering column housing and causes displacement of said steering column housing and is initially directed through said first member and not said second member, and at some predefined point thereafter during said displacement, said compressive force is passed through said second member, each of said first and second members including a traveling bight, said members absorbing said kinetic energy by forcing said traveling bight to travel a length of said members; and wherein said first member and said second member are configured in a J configuration, each said first and second members having a first end and a free end opposite said first end, said first end of said first member being fixed to a pusher fixed to one of said steering column housing and a body of said vehicle, said first end of said second member having a catch permitting limited movement of said second member with said pusher; said steering column further comprising an anvil arrangement comprising an anvil surface shaped to cooperate with each said traveling bight, said anvil surface being fixed to another of said steering column housing an a body of said vehicle;

each said first end and said free end being arranged generally parallel to each other, each of said traveling bights initially being adjacent to said first end prior to said displacement and traveling toward said free end during said displacement.

28. The steering column of claim 27, wherein said first member and said second member are nested against one another.

29. The steering column of claim 27, said pusher comprising a pin, said first member having a hole at said first end through which said pin extends thereby fixing said first end to said pusher, said catch comprising an elongated slot formed in said second member cooperating with said pin to permit said limited movement between said pin and said second member.

30. A kinetic energy absorbing collapsible steering column comprising:

an energy absorbing device absorbing kinetic energy by resisting compressive force against said collapsible steering column; the energy absorbing device including a steering column housing, a first plastically deformable member and a second plastically deformable member wherein said compressive force being exerted against said steering column housing and causes displacement of said steering column housing and is initially directed through said first member and not said second member, and at some predefined point thereafter during said displacement, said compressive force is passed through said second member, each of said first and second members including a traveling bight, said members absorbing said kinetic energy by forcing said traveling bight to travel a length of said members; and wherein said first member and said second member are configured in an M configuration, each of said first and second members having two free ends generally extending in a first direction, each of said first and second members further comprising a second traveling bight and a central bight generally extending in said first direction, said steering column further comprising an anvil arrangement comprising two anvil surfaces each positioned between said central bight and said free ends and proximate a respective one of said traveling bight and said second traveling bight of said first and second members, a pusher being positioned proximate said central bight of said first member; a catch comprising a deep central bight of said second member, resulting in a separation between said pusher and said central bight of said second member.

31. The steering column of claim 30 wherein said first member and said second member are nested against one another.

32. The steering column of claim 30 wherein said anvil arrangement comprises a recess formed in said steering column housing, said recess including said first and second anvil surfaces, said pusher comprising a bracket attachable to a body of a vehicle.

33. A kinetic energy absorbing collapsible steering column comprising:

an energy absorbing device absorbing kinetic energy by resisting compressive force against said collapsible steering column the energy absorbing device including a steering column housing, a first plastically deformable member and a second plastically deformable member wherein said compressive force being exerted against said steering column housing and causes displacement of said steering column housing and is initially directed through said first member and not said second member, and at some predefined point thereafter during said displacement, said compressive force is passed through said second member, each of said first and second members including a traveling bight, said members absorbing said kinetic energy by forcing said traveling bight to travel a length of said members; and wherein said first member and said second member are configured in an S configuration wherein each of said first and second members includes a first end and an opposite end, each said traveling bight being adjacent to said first end prior to said displacement, said traveling bights being forced to travel by an anvil arrangement.

34. The steering column of claim 33 wherein each said first end and said opposite end being substantially parallel to each other and extending in opposite directions.

35. The steering column of claim 33 wherein said anvil arrangement comprises at least three anvil surfaces, each of said first end and said opposite end extending in a common plane.

36. The steering column of claim 33 wherein said first member and said second member are nested against one another.

* * * * *